United States Patent [19]

Su

[11] Patent Number: 4,783,430
[45] Date of Patent: Nov. 8, 1988

[54] PROCESS OF MAKING HIGH PURITY ALUMINUM NITRIDE

[75] Inventor: Sophia R. Su, Weston, Mass.

[73] Assignee: GTE Laboratories Incorporated, Waltham, Mass.

[21] Appl. No.: 856,067

[22] Filed: Apr. 25, 1986

[51] Int. Cl.$^4$ .............................................. C04B 35/58
[52] U.S. Cl. ...................................... 501/96; 423/412
[58] Field of Search .......................................... 423/412

[56] References Cited

U.S. PATENT DOCUMENTS

| | | | |
|---|---|---|---|
| 3,551,101 | 12/1970 | Matsuo et al. | 423/412 |
| 3,572,992 | 3/1971 | Komeya et al. | 423/412 |
| 4,435,513 | 3/1984 | Komeya | 501/96 |
| 4,478,785 | 10/1984 | Huseby et al. | 264/65 |

FOREIGN PATENT DOCUMENTS

| | | | |
|---|---|---|---|
| 596302 | 4/1960 | Canada | 423/179.5 |
| 68700 | 6/1978 | Japan . | |

OTHER PUBLICATIONS

Skoog et al., *Fundamentals of Analytical Chemistry*, (1963), Holt, Rinehart and Winston, pp. 180–182.
Interrante, "Studies of Organometallic Precursors to Aluminum Nitride", Abstract of Materials Research Society Meeting, Apr. 1986 at Palo Alto, Calif.

*Primary Examiner*—John Doll
*Assistant Examiner*—Wayne A. Langel
*Attorney, Agent, or Firm*—Ivan L. Ericson

[57] ABSTRACT

A high purity aluminum nitride is made by precipitating $(CH_3)_3Al:NH_3$, washing it with hexane and pyrolyzing it to AlN. The precipitation is obtained by reacting a hexane solution of trimethyl aluminum with high purity anhydrous $NH_{3(g)}$, or by reaction $Al(CH_3)_{3(g)}$ and $NH_{3(g)}$ in a hexane solution, or by reacting $Al(CH_3)_{3(g)}$ with $NH_{3(l)}$. The resulting AlN is very pure and a density of 91.3% of theoretical has been achieved by pressing and sintering a pellet made from it as compared to a 89% theoretical density obtained by pressing and sintering a pellet made from commercial AlN powder.

7 Claims, No Drawings

PROCESS OF MAKING HIGH PURITY ALUMINUM NITRIDE

FIELD OF THE INVENTION

This invention relates to a method of making aluminum nitride. More particularly, it is concerned with a method of making high purity aluminum nitride using metalorganic precursors.

BACKGROUND OF THE INVENTION

Aluminum nitride (AlN) has a hexagonal wurtzite crystal structure and a theoretical density of 3.26 g/cm. It has a low thermal expansion coefficient, a high thermal conductivity, and a high melting point. When fully densified, AlN is resistant to water and mineral acids at ambient temperatures and stable in air up to 1450° C. The high temperature stability in air qualifies AlN as an excellent candidate for high temperature materials. However, the commercial AlN is usually contaminated with a large amount of oxygen in the form of $Al_2O_3$ which adversely affects the desireable properties of the AlN.

OBJECTS OF THE INVENTION

It is an object of the present invention to provide a method of making a high purity aluminum nitride using a metalorganic precursor.

It is a further object of the present invention to provide a method of making an air stable high purity aluminum nitride at a high yield.

Further and other objects of the present invention will become apparent from the description contained herein.

SUMMARY OF THE INVENTION

In accordance with one aspect of the present invention, a new and improved method of making high purity aluminum nitride comprises the following steps:

Step 1—Trimethyl aluminum is reacted with high purity anhydrous ammonia forming a white crystalline $(CH_3)_3Al:NH_3$.

Step 2—The product formed in step 1 is pyrolyzed in an inert atmosphere to form high purity aluminum nitride.

In accordance with another aspect of the present invention, a new and improved method of making a high purity densified aluminum nitride article comprises the following steps:

Step 1—Trimethyl aluminum is reacted with high purity anhydrous ammonia forming a white crystalline $(CH_3)_3Al:NH_3$.

Step 2—The product formed in step 1 is pyrolyzed in an inert atmosphere to form high purity aluminum nitride.

Step 3—The produce from step 2 is pressed to form a pressed article.

Step 4—The product from step 3 is sintered at a temperature of about 1850° C. to form a densified aluminum nitride article having a theoretical density of at least 91.3%.

In accordance with another aspect of the present invention, a new and improved method of making high purity aluminum nitride comprises the following steps:

Step 1—A hydrocarbon solution of Trimethyl aluminum is contacted with high purity anhydrous $NH_{3(g)}$ forming a precipitate generating heat.

Step 2—The heat generated in step 1 is removed by cooling the hydrocarbon solution.

Step 3—The precipitate formed from step 1 is partially redissolved in the hydrocarbon solution.

Step 4—The hydrocarbon solution from step 3 is evaporated with a nitrogen stream to form a white crystalline material.

Step 5—The white crystalline material is pyrolyzed in an inert atmosphere to form high purity aluminum nitride.

In accordance with another aspect of the present invention, a new and improved method of making high purity aluminum nitride comprises the following steps:

Step 1—$Al(CH_3)_3(g)$ and $NH_3(g)$ are contacted with a hydrocarbon solution forming a precipitate and generating heat.

Step 2—The heat generated in step 1 is removed by cooling the hydrocarbon solution.

Step 3—The precipitate formed from step 1 is partially redissolved in the hydrocarbon solution.

Step 4—The hydrocarbon solution from step 3 is evaporated with a nitrogen stream to form a white crystalline material.

Step 5—The white crystalline material is pyrolyzed in an inert atmosphere to form high purity aluminum nitride.

In accordance with another aspect of the present invention, a new and improved method of making high purity aluminum nitride comprises the following steps:

Step 1—$Al(CH_3)_{3(g)}$ is contacted with $NH_{3(l)}$ forming a precipitate and generating heat.

Step 2—The heat generated in step 1 is removed by cooling the $NH_{3(l)}$.

Step 3—The precipitate formed from step 1 is partially redissolved.

Step 4—The $NH_{3(l)}$ is evaporated with a nitrogen stream to form a white crystalline material.

Step 5—The white crystalline material is pyrolyzed in an inert atmosphere to form high purity aluminum nitride.

DETAILED DESCRIPTION OF THE INVENTION

Preparation of $(CH_3)_3Al:NH_3$ precursor.

Starting Materials

2M $Al(CH_3)_3$ in a hydrocarbon solution such as hexane was bought from Aldrich Chemicals. The hydrocarbon solution was dried and deaerated by distilling over calcium hydride under $N_2$ atmosphere.

High purity anhydrous $NH_{3(g)}$ was further dried by passing it through a column packed with KOH pellets. (¾" in diameter, 6" length).

Procedures

This reaction was carried out in a dry box. All of the glassware was dried in an oven at 110° C. A three neck, 100 ml round bottom flask was equipped with a gas inlet having a stopcock and a gas outlet, a septum and a stir bar. 40 ml of $Al(CH_3)_3$ in hexane (0.08 mole of $Al(CH_3)_3$) was transferred into the flask with a syringe through the septum. An excess of gaseous ammonia (Matheson, high purity lecture bottle ammonia), dried by passing it through a KOH column, was added, with stirring, to the solution through a gas inlet stopcock at a rate of 0.57 ml/sec for (approx.) 2 hrs. A total of 0.186 moles of $NH_3$ was added. The reaction is exothermic and a cooling of the flask is required to control the temperature increase. A white crystalline precipitate was formed at the interface of the hexane layer at the beginning of the reaction, and was then partially redissolved as it progressed. The solvent was removed by evaporation at room temperature using a $N_2$ stream promulgating a precipitation of a white crystalline material as the evaporation proceeded. Alternatively the hexane can be removed by vacuum distillation at $10^{-1}$ to $10^{-3}$ mm-Hg at room temperature. The white crystalline material was washed with dried hexane twice before characterization or the white crystalline material can be purified by recrystallization from hydrocarbon solvents, e.g. hexane, toluene or by sublimation of the white crystalline material at $10^{-1}$ to $10^{-3}$ mm-Hg. The white crystalling material was characterized as $(CH_3)_3Al:NH_3$ having a yield of 6.05 gr. of $(CH_3)_3Al:NH_3$ (0.068 mole) which calculates to a 85% yield based on $Al(CH_3)_3$.

Characterization of $Al(CH_3)_3.NH_3$ $(CH_3)_3Al:NH_3$ white crystalline material, fairly stable in air, which sublimes readily at 55° to 70° C. to release one mole of $CH_4$ to yield $3(CH_3)_2Al:NH_2$ but is easily hydrolyzed by moisture and a further loss of one mole of $CH_4$ occurs at 120°-170° C. to produce $CH_3AlNH$. Hexagonal AlN is formed at 900° C. under helium, argon or under vacuum. Fourier Transform Infrared spectroscopic analysis (FTIR) of the $(CH_3)_3Al:NH_3$ in KBr reveals the following absorption bonds:
 3500 cm$^{-1}$ N-H stretching;
 2926 cm$^{-1}$, 2885 cm$^{-1}$, and 2891 cm$^{-1}$ C-H stretching;
 1515 cm$^{-1}$ N-H bending;
 800-850 cm$^{-1}$ broad, Al-N.

Pyrolysis of $(CH_3)_3Al:NH_3$

The pyrolysis reaction was conducted under an inert atmosphere such as argon in a tube furnace with a heating rate of 10° C./min, up to 900° C. and held for 1 hr. then cooled at a cooling rate of 5.0° C./min to room temperature. The net loss is 59.25 wt. % as compared to a 53.9 wt. % theoretical value. The x-ray diffraction indicates that the residue after pyrolysis has a major phase of hexagonal AlN and a weak phase of cubic AlN.

Sintering of AlN produced from pyrolysis of $(CH_3)_3Al:NH_3$

One gram of the pyrolysis product, $(CH_3)_3Al:NH_3$, was die pressed to form a pellet. The pellet was sintered at 1850° C., in a 50 psi. $N_2$ overpressure to 91.3% of theoretical density (T.D.) as compared to 89.0% T.D. obtained from pellet made from a commercial AlN powder, a 2.3% improvement.

Other routes to produce air stable $(CH_3)_3 Al:NH_3$ include:
1. In Step 1, $Al(CH_3)_{3(g)}$ and $NH_{3(g)}$ are contacted with a deaerated, dried hexane or pentane solution to form a precipitate.
2. In Step 1, $Al(CH_3)_{3(g)}$ is dissolved in a stoichiometric amount of liquid $NH_3$ to form a precipitate or $Al(CH_3)_3$ in hexane solution is contacted with liquid $NH_3$ to form a precipitate. The reactions are exothermic and careful removal of the heat generated is required. This can be done by cooling the reaction flask in a cold bath such as acetone/dry ice slush, isopropanol/dry ice slush.

A thermogravimetric analysis showed a weight loss of 59% from 50° C. to 170° C. under $N_2$ or Ar. The expected weight loss was 54% as calculated from the pyrolysis reaction.

$$(CH_3)_3\ Al:NH_{3(s)} \rightarrow AlN(s) + 3CH_{4(g)}$$

Mass spectral analysis of gases evolved during the pyrolysis showed 98% of the gas to be methane, as expected from the pyrolysis reaction. The adduct can be sublimed under vacuum from 300° C. to 500° C. to form AlN. Fourier Transform Infrared spectroscopic analysis (FTIR) of the precursor indicated that the compound was $(CH_3)_3\ Al:NH_3$. Consistent with this structure was a broad N-H stretching frequency at 3500 cm$^{-1}$, C-H stretching frequencies at 2926, 2885, 2819 cm$^{-1}$, as well as N-H bending frequency at 1515 cm$^{-1}$ characteristic of a free amine.

Hexagonal AlN was formed after the pyrolysis of $(CH_3)_3\ Al:NH_3$ from about 900° C. to about 1400° C. under an inert gas such as argon, helium, or nitrogen. A diepressed AlN pellet prepared from the pyrolysis product of $(CH_3)_3Al:NH_3$ was sintered at 1850° C. in a 50 psi $N_2$ overpressure to 91.3% of its theoretical density as compared to 89% T.D. obtained from a commercial AlN powder.

The metalorganic precursor of this invention is airstable, has a low melting point, a high AlN yield upon pyrolysis, and the gaseous species evolved during pyrolysis is nontoxic.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method of making high purity aluminum nitride comprising the following steps:
   Step 1—contacting a hydrocarbon solution of trimethyl aluminum with high purity anhydrous $NH_3(g)$ forming a precipitate and generating heat;
   Step 2—removing the heat generated in step 1 by cooling the hydrocarbon solution;
   Step 3—redissolving the precipitate formed in step 1 in the hydrocarbon solution;
   Step 4—evaporating the hydrocarbon solution from step 3 with a nitrogen stream to form a white crystalline material; and
   Step 5—pyrolyzing the white crystalline material form step 4 in an inert atmosphere to form high purity aluminum nitride.

2. A method in accordance with claim 1 wherein said pyrolysis comprises heating the product from step 4 to about 900° C. in an inert atmosphere.

3. A method in accordance with claim 1 wherein said hydrocarbon solution comprises a hexane solution.

4. A method of making high purity aluminum nitride comprising the following steps:
   Step 1—contacting $Al(CH_3)_{3(g)}$ and $NH_{3(g)}$ with a hydrocarbon solution forming a precipitate and generating heat;
   Step 2—removing the heat generated in step 1 by cooling the hydrocarbon solution;
   Step 3—redissolving the precipitate formed in step 1 in the hydrocarbon solution;

Step 4—evaporating the hydrocarbon solution from step 3 with a nitrogen stream to form a white crystalline material; and Step 5—pyrolyzing the washed white crystalline material from step 4 in an inert atmosphere to form high purity aluminum nitride.

5. A method in accordance with claim 4 wherein said hydrocarbon solution comprises a hexane solution.

6. A method of making high purity aluminum nitride comprising the following steps:

Step 1—contacting $Al(CH_3)_{3(g)}$ with $NH_{3(l)}$ forming a precipitate and generating heat;

Step 2—removing the heat generated in step 1 by cooling the $NH_{3(l)}$;

Step 3—redissolving the precipitate formed from step 1;

Step 4—evaporating the $NH_{3(l)}$ with a nitrogen stream to form a white crystalline material; and Step 5—pyrolyzing the white crystalline material from step 4 in an inert atmosphere to form high purity aluminum nitride.

7. A method of making high purity aluminum nitride comprising the following steps:

Step 1—contacting a hydrogen carbon solution of trimethyl aluminum with high purity anhydrous $NH_{3(g)}$ forming a precipitate and generating heat;

Step 2—removing the heat generated in step 1 by cooling the hydrocarbon solution;

Step 3—redissolving the precipitate formed in step 1 in the hydrocarbon solution;

Step 4—evaporating the hydrocarbon solution from step 3 with a nitrogen stream to form a white crystalline material;

Step 5—pyrolyzing the white crystalline material from step 4 in an inert atmosphere to form high purity aluminum nitride;

Step 6—pressing the product from step 5 to form a pressed article; and

Step 7—sintering the product from step 6 at a temperature of about 1850° C. to form a densified aluminum nitride article having a theoretical density of at least 91.3%.

* * * * *